(12) United States Patent
Alford, Jr. et al.

(10) Patent No.: US 9,760,557 B2
(45) Date of Patent: Sep. 12, 2017

(54) TAGGING AUTOFILL FIELD ENTRIES

(71) Applicant: International Business Machines Corporation, Armonk, NY (US)

(72) Inventors: Jack A. Alford, Jr., Austin, TX (US); Scott H. Isensee, Austin, TX (US); James L. Lentz, Austin, TX (US); Kelly L. Lisai, Austin, TX (US); Jorge R. Nogueras, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 13/733,920

(22) Filed: Jan. 4, 2013

(65) Prior Publication Data

US 2014/0195888 A1    Jul. 10, 2014

(51) Int. Cl.
*G06F 17/22*    (2006.01)
*G06F 17/24*    (2006.01)
*G06F 17/30*    (2006.01)

(52) U.S. Cl.
CPC ...... *G06F 17/243* (2013.01); *G06F 17/30899* (2013.01)

(58) Field of Classification Search
CPC ......... G06F 17/243; G06F 2203/04808; G06F 3/0488; G06F 21/31; G06F 17/276; G06F 2221/2111; G06F 17/30899
USPC ....................................................... 715/226
See application file for complete search history.

(56) References Cited

U.S. PATENT DOCUMENTS

| | | | | |
|---|---|---|---|---|
| 6,208,339 B1* | 3/2001 | Atlas | ...................... | G06F 3/0481 715/205 |
| 6,643,624 B2* | 11/2003 | Philippe | .................. | G06F 17/22 705/26.62 |
| 6,829,607 B1* | 12/2004 | Tafoya | ................. | G06Q 10/107 |
| 7,343,551 B1* | 3/2008 | Bourdev | ............... | G06F 17/243 715/224 |
| 7,500,201 B2 | 3/2009 | Treibach-Heck et al. | | |
| 7,512,654 B2* | 3/2009 | Tafoya | ................. | G06Q 10/107 707/999.002 |
| 7,600,182 B2* | 10/2009 | Carr | ....................... | G06F 17/243 715/222 |
| 7,685,144 B1* | 3/2010 | Katragadda | ............ | 707/999.101 |
| 7,779,345 B2* | 8/2010 | Topalov | ................ | G06F 15/167 715/224 |
| 7,831,913 B2 | 11/2010 | MacLaurin | | |
| 8,621,382 B1* | 12/2013 | Young | .................. | G06Q 10/107 715/700 |

(Continued)

OTHER PUBLICATIONS

"Custom and customized content types"; Custom and customized content types/Drupal Gardens; Printed Sep. 14, 2012; <http://www.drupalgardens.com/documentation/content/custom-content-types>.

(Continued)

*Primary Examiner* — Maikhanh Nguyen
(74) *Attorney, Agent, or Firm* — Alexander G. Jochym; Nicholas L. Cadmus (57) ABSTRACT

In a method for utilizing metadata for autofill fields, a computer causes a first form input field to be displayed, the first form input field having two or more form input field entries associated with the first form input field. The computer determines that the two or more form input field entries are similar. The computer determines data describing each form input field entry of the two or more form input field entries.

14 Claims, 4 Drawing Sheets

(56) References Cited

U.S. PATENT DOCUMENTS

| | | | |
|---|---|---|---|
| 2002/0083068 A1* | 6/2002 | Quass | G06F 17/243 |
| 2002/0133509 A1* | 9/2002 | Johnston | G06F 17/243 |
| 2003/0028792 A1* | 2/2003 | Plow | G06F 17/243 |
| | | | 715/226 |
| 2005/0257134 A1* | 11/2005 | Goodman | G06F 17/243 |
| | | | 715/226 |
| 2005/0257148 A1* | 11/2005 | Goodman | G06F 17/243 |
| | | | 715/226 |
| 2006/0059434 A1* | 3/2006 | Boss | G06F 17/243 |
| | | | 715/780 |
| 2006/0230033 A1* | 10/2006 | Halevy | G06F 17/243 |
| 2007/0203829 A1* | 8/2007 | Polanco | G06Q 40/02 |
| | | | 705/39 |
| 2011/0314402 A1 | 12/2011 | Kikin-Gil et al. | |
| 2013/0081120 A1* | 3/2013 | DeLuca | H04W 4/04 |
| | | | 726/7 |
| 2013/0117652 A1* | 5/2013 | Folsom et al. | 715/222 |
| 2014/0081657 A1* | 3/2014 | Neuvonen | G06F 19/323 |
| | | | 705/3 |
| 2014/0237342 A1* | 8/2014 | King | G06F 17/30876 |
| | | | 715/224 |

OTHER PUBLICATIONS

"Add Bookmark—Autofill Fields"; SOCIALADR Blog; Printed Sep. 14, 2012; <http://blog.socialadr.com/functionality-changes/add-bookmark-autofill-fields/2011-03-22/>.

\* cited by examiner

TAGGING AUTOFILL FIELD ENTRIES

TECHNICAL FIELD

The present invention relates generally to autofill functions, and more specifically to a method, system, and computer program product for tagging autofill field entries with metadata.

BACKGROUND

Many programs that display forms include an "autofill" function that will store inputs to a form field. This is a common feature of web browsers. Popular web browsers that include some autofill functionality include Internet Explorer® (registered trademark of Microsoft Corporation) and Safari® (registered trademark of Apple Inc.). When a user encounters the same form field again and begins to enter characters into the field, the web browser will display some or all of the previous entries for this field, typically in a drop-down menu, and allow the user to select one of the displayed entries to populate the field.

The autofill functionality typically narrows down the list of displayed previous user entries to those that begin with the characters the user has entered so far into the field. As an example, a user may use several email accounts to receive information from different websites. When the web browser is displaying a web page received from a website that is requesting an email address, the user mouse-clicks in the email address form field and the web browser displays all email addresses that have been entered in any email address form field at any website with that browser. As the user begins entering an email address, the list of displayed previously entered email addresses is first narrowed to those email addresses that begin with the first character the user has entered, then is narrowed to email addresses that begin with the first two characters entered, and so on. If the user is entering an email address that has not been used before in an email address form field, then at some point there will not be a match to any previously entered email addresses. When this occurs, no matching previously entered email addresses will be displayed and the browser will typically store the new email address entry. At any time, the user may select one of the displayed previously entered email addresses to populate the field, or select the "enter" key to populate the field with the characters entered so far.

SUMMARY

Aspects of an embodiment of the present invention disclose a method, computer program product, and a computer system for utilizing metadata for autofill fields. A computer causes a first form input field to be displayed, the first form input field having two or more form input field entries associated with the first form input field. The computer determines that the two or more form input field entries are similar. The computer determines data describing each form input field entry of the two or more form input field entries.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures.

Figure 1:
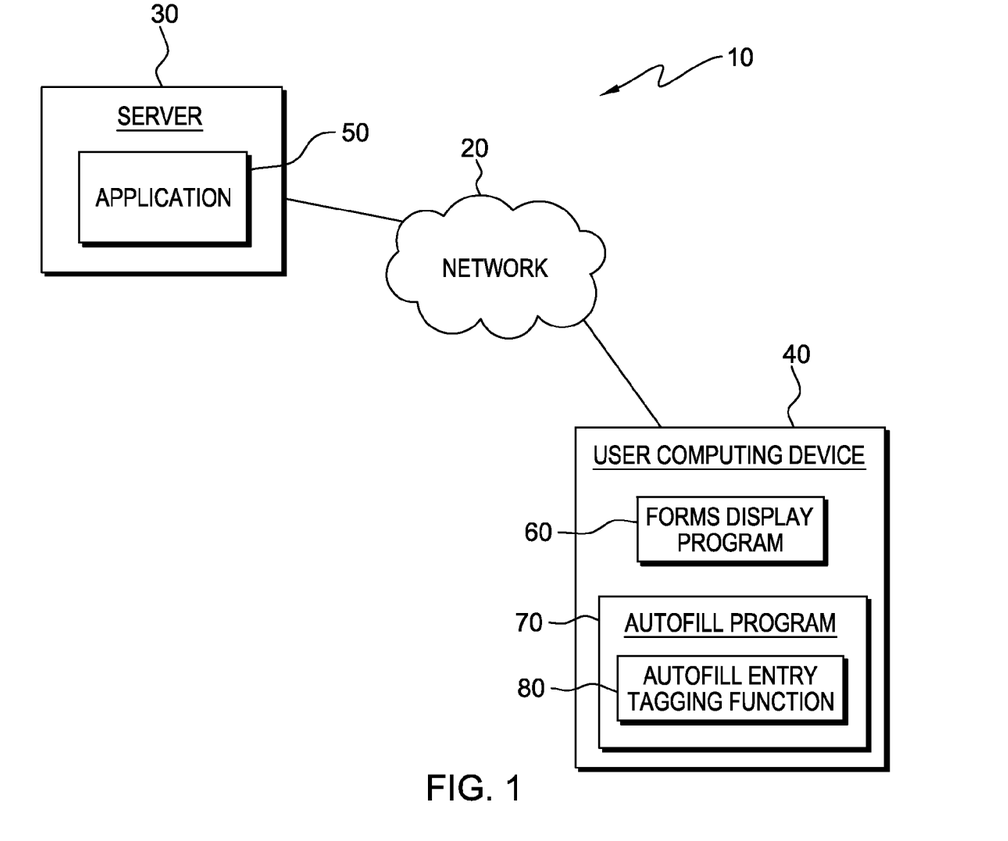
FIG. 1 depicts a diagram of a computing system in accordance with one embodiment of the present invention.

FIG. 1 depicts a diagram of a computing system 10 in accordance with one embodiment of the present invention. FIG. 1 provides only an illustration of one embodiment and does not imply any limitations with regard to the environments in which different embodiments may be implemented.

In the depicted embodiment, computing system 10 includes a server 30 and a user computing device 40 interconnected over a network 20. Server 30 and user computing device 40 may each include components as depicted in further detail with respect to FIG. 4. Server 30 may be a management server, a web server, or any other electronic device or computing system capable of receiving and sending data. In other embodiments, server 30 may represent a server computing system utilizing multiple computers as a server system, such as in a cloud computing environment. User computing device 40 may be a desktop computer, laptop computer, tablet computer, personal digital assistant (PDA), thin client, or smart phone. In general, user computing device 40 may be any electronic device or computing system capable of sending and receiving data, and communicating with server 30 over network 20. Network 20 may be a local area network (LAN), a wide area network (WAN) such as the Internet, any combination thereof, or any combination of connections and protocols that will support communications between server 30 and user computing device 40 in accordance with embodiments of the invention. Network 20 may include wired, wireless, or fiber optic connections. Computing system 10 may include additional servers, client computers, or other devices not shown.

Application 50 operates to receive and manage requests for a resource from forms display program 60. In one embodiment, a resource may be an internet resource such as a web page that is on a website. A web page may be authored primarily in hypertext markup language (HTML), which supports the display of forms with form input fields, and may contain at least one form having at least one form input field. In another embodiment, a resource may be a web application. A web application may be an application that is accessed over a network such as the Internet. In general, a resource may be any computer resource whose location may be specified by a URL. For example, a file stored locally may have a URL with a prefix of "file" and a resource to be retrieved over the internet using Hypertext Transfer Protocol (HTTP) may have a URL with a prefix of "HTTP." In one embodiment, application 50 resides on server 30. In other embodiments, application 50 may reside on another server or another computing device, provided that application 50 can communicate with forms display program 60.

Forms display program 60 operates on user computing device 40. In general, forms display program 60 may be any application that has the capability to display at least a form having a form input field. In one embodiment, forms display program 60 may be a dedicated web browser application such as Internet Explorer® or Safari®. These web browsers display web pages received over the Internet from specific. In addition, these web browsers include form field autofill functionality. In other embodiments, forms display program 60 may be, for example, a program or function within a standalone application.

Autofill program 70 operates with forms display program 60 to store form input field entries in a database, and display these stored entries when a user entry is detected in a form input field. The database resides on user computing device 40. In other embodiments, the database may reside on another user computing device or server provided that the database is accessible to autofill program 70. Autofill program 70 performs an incremental search of the database and displays form input field entries that match the characters entered, typically in a drop-down menu adjacent the form input field, and allows the user to select a displayed entry to populate the form input field. Form input field entries may be saved and applied to one specific form input field or to a group of form input fields that are of the same type. Common form input fields may be labeled, for example, as "email", "address", "name", "telephone", etc.

Autofill program 70 may also operate to display metadata describing a form input field entry. In one embodiment, autofill program 70 allows a user to supply metadata to describe a form input field entry. Metadata may be text, rich text, images, links, and/or audio clips. Autofill program 70 displays the form input field entry along with the supplied metadata. In another embodiment, autofill program 70 displays metadata describing a form input field entry determined by autofill entry tagging function 80. Adding metadata assists a user in rapidly locating the target field entry and distinguishes the target field entry from similar filed entries.

Autofill entry tagging function 80 operates to determine metadata describing each form input field entry of two or more form input field entries. In one embodiment, autofill entry tagging function 80 determines whether the two or more form input field entries are similar. In response to determining that the two or more form input field entries are similar autofill entry tagging function 80 determines metadata describing each form input field entry of the two or more form input field entries. Metadata may be text, rich text, images, links, and/or audio clips. In one embodiment, autofill entry tagging function 80 is a function of autofill program 70 on user computing device 40. In another embodiment, autofill entry tagging function 80 may be a separate program residing on user computing device 40, or on another computing device, or on a server, provided that autofill entry tagging function 80 can communicate with autofill program 70.

Figure 2:
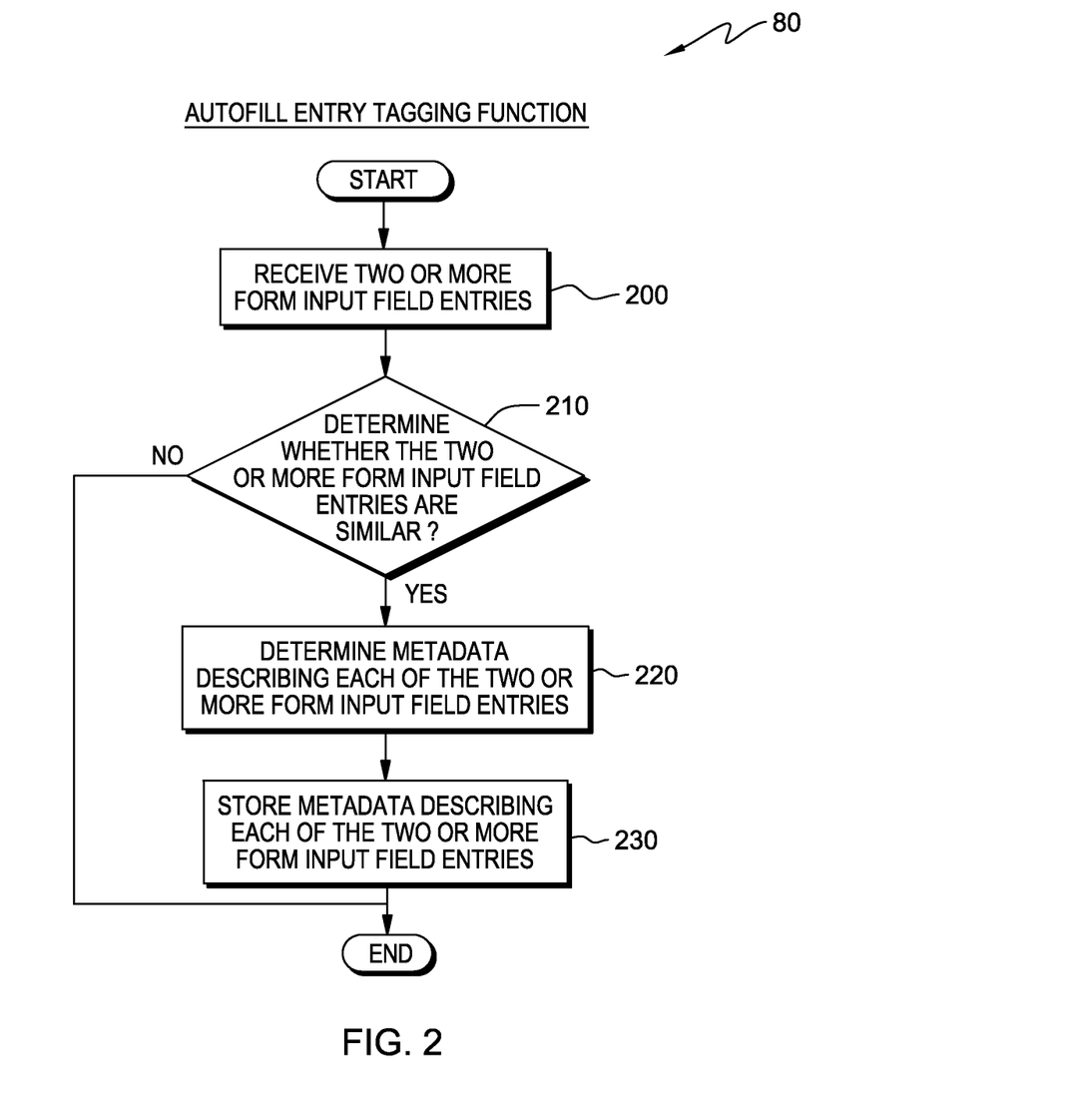
FIG. 2 depicts a flowchart of the steps of an autofill entry tagging function executing within the computing system of FIG. 1, for determining metadata describing each form input field entry of two or more form input field entries, in accordance with one embodiment of the present invention.

FIG. 2 depicts a flowchart of the steps of autofill entry tagging function 80 executing within the computing system of FIG. 1, for determining metadata describing each form input field entry of two or more form input field entries, in accordance with one embodiment of the present invention.

In one embodiment, initially, forms display program 60 receives a form to display from application 50. The form includes at least one form input field. In response to receiving the form including the at least one form input field, forms display program 60 calls autofill program 70 to retrieve stored form input field entries associated with the at least one form input field. Form input field entries may be saved and associated with one specific form input field or to a group of form input fields that are of the same type.

In one embodiment, autofill program 70 determines if the at least one form input field is a specific form input field or belongs to a group of form input fields that are of the same type. Autofill program 70 checks the HTML tag of the at least one form input field to determine if the at least one form input field is a specific form input field or belongs to a group of form input fields that are of the same type. For example, if the HTML tag of the at least one form input field is labeled as "email," autofill program 70 determines that the at least one form input field belongs to a group of form input fields that are of the same type, the type being "email" form input fields.

In one embodiment, autofill program 70 retrieves stored form input field entries for the at least one form input field from a database. For example, if the at least one form input field belongs to the group of form input fields that are of the "email" form input field type, autofill program 70 retrieves stored form input field entries for the "email" form input field type. If the stored form input field entries includes two or more form input field entries for the at least one form input field, autofill program 70 sends the two or more form input field entries to autofill entry tagging function 80.

In step 200, autofill entry tagging function 80 receives the two or more form input field entries for the at least one form input field. In response to receiving the two or more form input field entries for the at least one form input field, autofill entry tagging function 80 determines whether the two or more form input field entries are similar (decision 210). In one embodiment, autofill entry tagging function 80 compares the two or more form input field entries to determine whether the two or more form input field entries are similar. Autofill entry tagging function 80 may use pattern matching, semantic analysis, or any other method to compare the two or more form input field entries. For example, autofill entry tagging function 80 may search the two or more form input field entries for a pattern. Autofill entry tagging function 80 may determine that each entry contains an "at symbol" (@), that each entry includes only numeric values, or that each entry is in the form of a telephone number (e.g., 123-456-7890). If a pattern is found, autofill entry tagging function 80 determines that the two or more form input field entries are similar. If autofill entry tagging function 80 determines that the two or more form input field entries are not similar (decision 210, no branch), autofill entry tagging function 80 ends.

If autofill entry tagging function 80 determines that the two or more form input field entries are similar (decision 210, yes branch), autofill entry tagging function 80 determines metadata describing each form input field entry of the two or more form input field entries (step 220).

In one embodiment, autofill entry tagging function 80 determines metadata describing each form input field entry of the two or more form input field entries based on the form input field associated with the two or more form input field entries. For example, if the HTML tag of the form input field is labeled as "email," the form input field belongs to a group of form input fields that are of the same type, the type being "email" form input fields. If the form input field is labeled as "email," the two or more form input field entries are email addresses. Autofill entry tagging function 80 accesses a repository related to the type of the form input field, such as an address book or contact list, on user computing device 40 to determine a name associated with each form input field entry of the two or more form input field entries. The determined names associated with each form input field entry are the metadata describing each form input field entry of the two or more form input field entries. In another example, if the HTML tag of the form input field is labeled as "telephone," the form input field belongs to a group of form input fields that are of the same type, the type being "telephone" form input fields. If the form input field is labeled as "telephone," the two or more form input field entries are telephone numbers. Autofill entry tagging function 80 accesses an address book or contact list on user computing device 40 to determine a name associated with each form input field entry of the two or more form input field entries. The determined names associated with each form input field entry are the metadata describing each form input field entry of the two or more form input field entries.

In another embodiment, autofill entry tagging function 80 determines metadata describing each form input field entry of the two or more form input field entries based on the two or more form input field entries. For example, if in step 210 autofill entry tagging function 80 determines that each entry contains an "at symbol" (@), autofill entry tagging function 80 determines that the two or more form input field entries are email addresses. Autofill entry tagging function 80 accesses an address book or contact list on user computing device 40 to determine a name associated with each form input field entry of the two or more form input field entries. The determined names associated with each form input field entry are the metadata describing each form input field entry of the two or more form input field entries.

In step 230, autofill entry tagging function 80 stores the metadata describing each form input field entry of the two or more form input field entries. In one embodiment, autofill entry tagging function 80 stores the metadata describing each form input field entry of the two or more form input field entries to the database.

The metadata describing each form input field entry of the two or more form input field entries may be accessed and displayed by autofill program 70. Autofill program 70 operates with forms display program 60 to display the two or more form input field entries and the metadata describing each form input field entry of the two or more form input field entries when a user entry is detected in the form input field that the two or more form input field entries are associated with. In one embodiment, autofill program 70 operates with forms display program 60 to display the two or more form input field entries and the metadata describing each form input field entry of the two or more form input field entries in a drop-down menu adjacent to the form input field. The drop-down menu may have two columns with one column for each form input field entry and a second column for the metadata describing each form input field entry.

Figure 3:
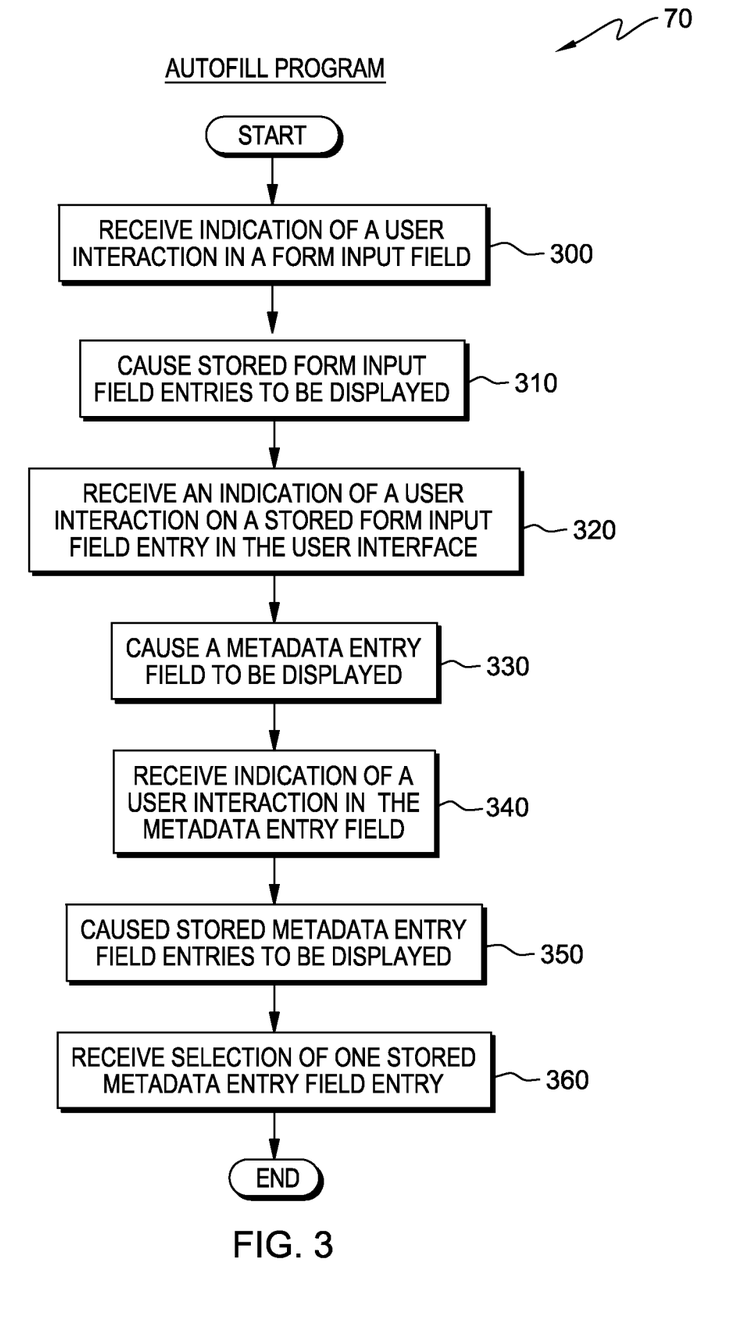
FIG. 3 depicts a flowchart of the steps of autofill program executing within the computing system of FIG. 1, for providing an interface to allow a user to supply metadata describing a form input field entry, in accordance with one embodiment of the present invention.

FIG. 3 depicts a flowchart of the steps of autofill program 70 executing within the computing system of FIG. 1, for providing an interface to allow a user to supply metadata describing a form input field entry, in accordance with one embodiment of the present invention.

In one embodiment, initially, forms display program 60 receives a form to display from application 50. The form includes at least one form input field. A user at user computing device 40 causes a user interaction in a form input field of the form received by forms display program 60. The user interaction may be a left mouse click in the form input field or a character entry in the form input field in a user interface of user computing device 40. Forms display program 60 receives an indication of the user interaction from the user interface. Forms display program 60 send the indication of the user interaction in the form input field to autofill program 70.

In step 300, autofill program 70 receives the indication of the user interaction in the form input field. In response to receiving the indication of the user interaction in the form input field, autofill program 70 causes stored form input field entries associated with the form input field to be displayed (step 310).

In one embodiment, autofill program 70 determines if the form input field is a specific form input field or belongs to a group of form input fields that are of the same type. Autofill program 70 checks the HTML tag of the form input field to determine if the form input field is a specific form input field or belongs to a group of form input fields that are of the same type. For example, if the HTML tag of the form input field is labeled as "email," autofill program 70 determines that the form input field belongs to a group of form input fields that are of the same type, the type being "email" form input fields. In one embodiment, autofill program 70 retrieves stored form input field entries for the form input field from a database. For example, if the form input field belongs to the group of form input fields that are of the "email" form input field type, autofill program 70 retrieves stored form input field entries for the "email" form input field type. In one embodiment, autofill program 70 operates with forms display program 60 to display the stored form input field entries for the form input field. For example, the stored form input field entries are displayed in a drop-down menu adjacent to the form input field.

In step 320, autofill program 70 receives an indication of a user interaction on a stored form input field entry of the stored form input field entries in the user interface of user computing device 40. The user interaction may be, for example a right mouse click or a touch event. In response to receiving the indication of the user interaction on the stored form input field entry, autofill program 70 causes a metadata entry field to be displayed (step 330). In one embodiment, autofill program 70 operates with forms display program 60 to display the metadata entry field. For example, the metadata entry field may be displayed as a pop-up box. In other examples, the metadata entry field may be displayed inline with the stored form input field entry within the drop-down menu displayed in step 310.

In step 340, autofill program 70 receives an indication of a user interaction in the metadata entry field. In one embodiment, autofill program 70 receives characters entered in the metadata entry field in the user interface of user computing device 40. If the user indicates that they are finished entering characters in to the metadata entry field, autofill program 70 stores the metadata entered describing the form input field entry. For example, autofill program 70 stores the metadata describing the form input field entry to the database. The user may indicate that they are finished entering characters in to the metadata entry field by pushing the "enter" key. In another embodiment, autofill program 70 may store the metadata describing the form input field entry as a metadata field entry. The metadata entry field may be associated with a group of form input fields that are of the same type. Common form input fields may be labeled, for example, as "email", "address", "name", "telephone", etc.

In response to receiving an indication of a user interaction in the metadata entry field, autofill program 70 causes the stored metadata field entry to be displayed (step 350).

In one embodiment, autofill program 70 determines if the metadata entry field is a specific form input field or belongs to a group of form input fields that are of the same type. If the metadata entry field is a specific form input field and does not belong to a group of form input fields that are of the same type, autofill program 70 retrieves the stored metadata field entry. If the metadata entry field is not a specific form input field and does belong to a group of form input fields that are of the same type, autofill program 70 retrieves the stored metadata field entry and stored form input field entries for the input field type. In one embodiment, autofill program 70 operates with forms display program 60 to display the stored metadata field entry, or the stored metadata field entry and stored form input field entries for the input field type. For example, the stored form input field entries are displayed in a drop-down menu adjacent to the form input field.

In step 360, autofill program 70 receives a selection of the stored metadata field entry. In one embodiment, autofill program 70 receives a left mouse click on the stored metadata field entry in the user interface of user computing device 40. Autofill program 70 then operates with forms display program 60 to display the stored metadata field entry in the metadata entry field.

Figure 4:
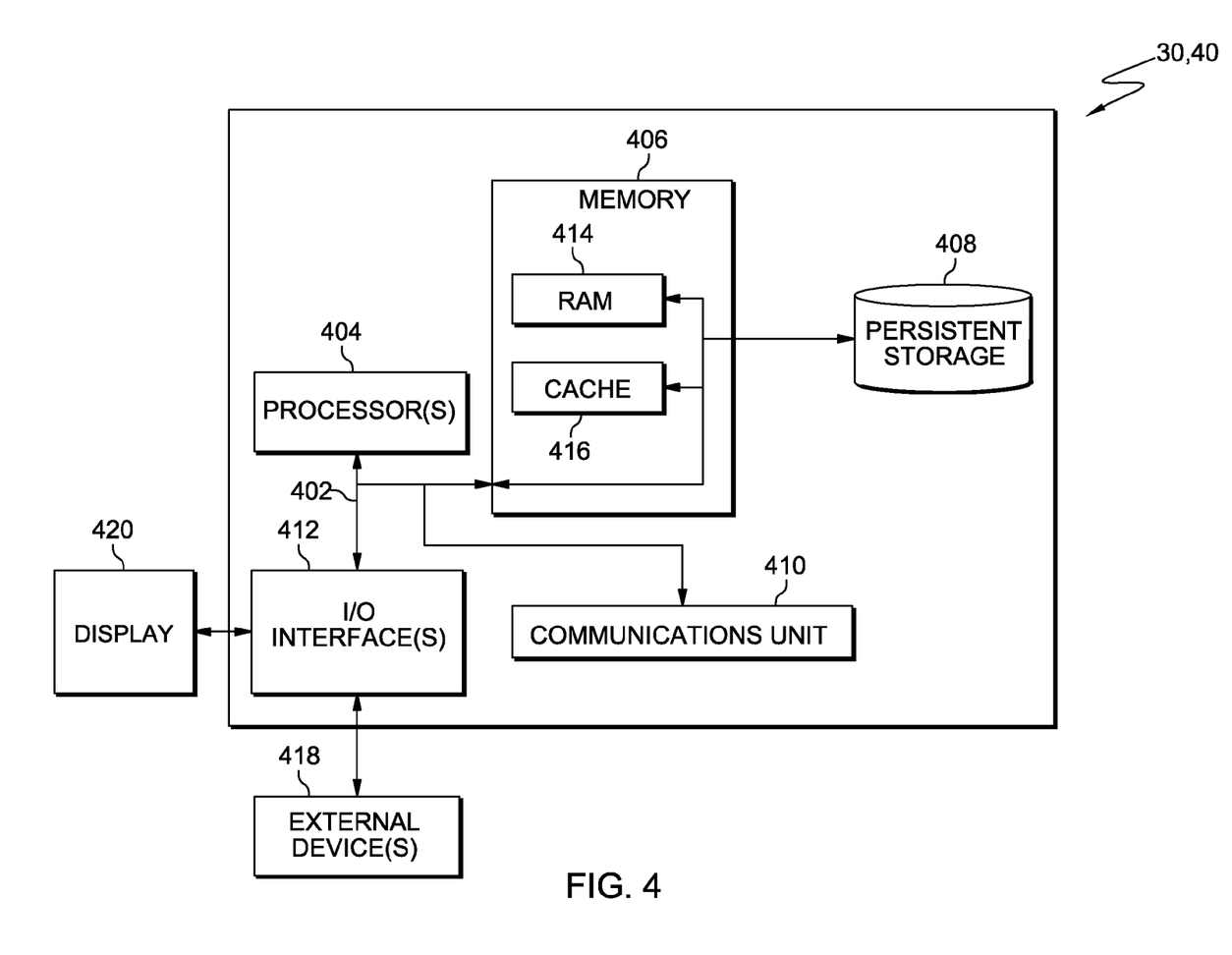
FIG. 4 is a block diagram of internal and external components of the server and the user computing device of FIG. 1 in accordance with one embodiment of the present invention.

FIG. 4 depicts a block diagram of components of server 30 and user computing device 40 in accordance with one embodiment of the present invention. It should be appreciated that FIG. 4 provides only an illustration of one implementation and does not imply any limitations with regard to the environments in which different embodiments may be implemented. Many modifications to the depicted environment may be made.

Server 30 and user computing device 40 each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In one embodiment, memory 406 includes random access memory (RAM) 414 and cache memory 416. In general, memory 406 can include any suitable volatile or non-volatile computer-readable storage media.

Application 50 is stored in persistent storage 408 of server 30 for execution by one or more of the respective computer processors 404 of server 30 via one or more memories of memory 406 of server 30. Forms display program 60, autofill program 70, and autofill entry tagging function 80 are stored in persistent storage 408 of user computing device 40 for execution and/or access by one or more of the respective computer processors 404 of user computing device 40 via one or more memories of memory 406 of user computing device 40. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other servers, data processing systems, or devices. In these examples, communications unit 410 includes one or more network interface cards. Communications unit 410 may provide communications through the use of either or both physical and wireless communications links. Application 50 may be downloaded to persistent storage 408 of server 30 through communications unit 410 of server 30. Forms display program 60, autofill program 70, and autofill entry tagging function 80 may be downloaded to persistent storage 408 of user computing device 40 through communications unit 410 of user computing device 40.

I/O interface(s) 412 allows for input and output of data with other devices that may be connected to server 30 or user computing device 40. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., application 50 can be stored on such portable computer-readable storage media and can be loaded onto persistent storage 408 of server 30 via I/O interface(s) 412 of server 30. Software and data used to practice embodiments of the present invention, e.g., forms display program 60, autofill program 70, and autofill entry tagging function 80 can be stored on such portable computer-readable storage media and can be loaded onto persistent storage 408 of server 40 via I/O interface(s) 412 of user computing device 40. I/O interface(s) 412 also connect to a display 420.

Display 420 provides a mechanism to display data to a user and may be, for example, a computer monitor or a touch screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for utilizing metadata for autofill fields, the method comprising the steps of:
    a computer causing a first form including a first form input field to be displayed, the first form input field having two or more form input field entries associated with the first form input field;
    the computer determining that the two or more form input field entries are similar;
    responsive to determining that the two or more form input field entries are similar, the computer determining data describing each form input field entry of the two or more form input field entries, wherein any data describing a form input field entry of the two or more form input field entries is unique;
    the computer receiving a first indication of a user interaction in the first form input field in a user interface;
    the computer causing the two or more form input field entries to be displayed in the user interface;
    the computer causing the data describing each form input field entry of the two or more form input field entries to be displayed in the user interface; and
    wherein each form input field entry of the two or more form input field entries is displayed in a first column of a drop-down menu and the data describing each form input field entry of the two or more form input field entries is displayed in a second column of a drop-down menu, and wherein the drop-down menu is adjacent to the first form input field.

2. The method of claim 1, wherein the step of the computer determining data describing each form input field entry of the two or more form input field entries comprises:
    the computer determining a type of the form input field; and
    the computer accessing a repository related to the type of the form input field to retrieve data describing each form input field entry.

3. The method of claim 1, wherein the step of the computer determining that the two or more form input field entries are similar comprises the computer comparing the two or more form input field entries using pattern matching.

4. The method of claim 1, further comprising the steps of:
the computer receiving a second indication of a user interaction on one form input field entry of the two or more form input field entries displayed in the user interface; and
the computer causing a second form input field to be displayed in the user interface.

5. The method of claim 4, further comprising the steps of:
the computer receiving a third indication of a user interaction in the second form input field in the user interface; and
the computer causing at least one form input field entries associated with the second form input field to be displayed in the user interface.

6. A computer program product for utilizing metadata for autofill fields, the computer program product comprising:
one or more computer-readable hardware storage devices and program instructions stored on at least one of the one or more computer-readable hardware storage devices, the program instructions comprising:
program instructions to cause a first form including a first form input field to be displayed, the first form input field having two or more form input field entries associated with the first form input field;
program instructions to determine that the two or more form input field entries are similar;
program instructions, responsive to determining that the two or more form input field entries are similar, to determine data describing each form input field entry of the two or more form input field entries, wherein any data describing a form input field entry of the two or more form input field entries is unique;
program instructions to receive a first indication of a user interaction in the first form input field in a user interface;
program instructions to cause the two or more form input field entries to be displayed in the user interface;
program instructions to cause the data describing each form input field entry of the two or more form input field entries to be displayed in the user interface; and
wherein each form input field entry of the two or more form input field entries is displayed in a first column of a drop-down menu and the data describing each form input field entry of the two or more form input field entries is displayed in a second column of a drop-down menu, and wherein the drop-down menu is adjacent to the first form input field.

7. The computer program product of claim 6, wherein the program instructions to determine data describing each form input field entry of the two or more form input field entries comprise:
program instructions to determine a type of the form input field; and
program instructions to access a repository related to the type of the form input field to retrieve data describing each form input field entry.

8. The computer program product of claim 6, wherein the program instructions to determine that the two or more form input field entries are similar comprise program instruction to compare the two or more form input field entries using pattern matching.

9. The computer program product of claim 6, further comprising:
program instructions, stored on at least one of the one or more computer-readable hardware storage devices, to receive a second indication of a user interaction on one form input field entry of the two or more form input field entries displayed in the user interface; and
program instructions, stored on at least one of the one or more computer-readable hardware storage devices, to cause a second form input field to be displayed in the user interface.

10. The computer program product of claim 9, further comprising:
program instructions, stored on at least one of the one or more computer-readable hardware storage devices, to receive a third indication of a user interaction in the second form input field in the user interface; and
program instructions, stored on at least one of the one or more computer-readable hardware storage devices, to cause at least one form input field entries associated with the second form input field to be displayed in the user interface.

11. A computer system for utilizing metadata for autofill fields, the computer system comprising:
one or more computer processors;
one or more computer-readable storage media;
program instructions stored on the computer-readable storage media for execution by at least one of the one or more processors, the program instructions comprising:
program instructions to cause a first form including a first form input field to be displayed, the first form input field having two or more form input field entries associated with the first form input field;
program instructions to determine that the two or more form input field entries are similar;
program instructions, responsive to determining that the two or more form input field entries are similar, to determine data describing each form input field entry of the two or more form input field entries, wherein any data describing a form input field entry of the two or more form input field entries is unique;
program instructions to receive a first indication of a user interaction in the first form input field in a user interface;
program instructions to cause the two or more form input field entries to be displayed in the user interface;
program instructions to cause the data describing each form input field entry of the two or more form input field entries to be displayed in the user interface; and
wherein each form input field entry of the two or more form input field entries is displayed in a first column of a drop-down menu and the data describing each form input field entry of the two or more form input field entries is displayed in a second column of a drop-down menu, and wherein the drop-down menu is adjacent to the first form input field.

12. The computer system of claim 11, wherein the program instructions to determine data describing each form input field entry of the two or more form input field entries comprise:
program instructions to determine a type of the form input field; and
program instructions to access a repository related to the type of the form input field to retrieve data describing each form input field entry.

13. The computer system of claim 11, wherein the program instructions to determine that the two or more form input field entries are similar comprise program instruction to compare the two or more form input field entries using pattern matching.

14. The computer system of claim 12, further comprising:
- program instructions, stored on the computer-readable storage media for execution by at least one of the one or more processors, to receive a second indication of a user interaction on one form input field entry of the two or more form input field entries displayed in the user interface; and
- program instructions, stored on the computer-readable storage media for execution by at least one of the one or more processors, to cause a second form input field to be displayed in the user interface.

* * * * *